US011425886B2

(12) United States Patent
Weerappuli et al.

(10) Patent No.: US 11,425,886 B2
(45) Date of Patent: Aug. 30, 2022

(54) PET RESTRAINT SYSTEM

(71) Applicant: Ford Global Technologies, LLC, Dearborn, MI (US)

(72) Inventors: Parakrama Valentine Weerappuli, West Bloomfield, MI (US); Saeed David Barbat, Novi, MI (US); Derek Board, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 17/078,182

(22) Filed: Oct. 23, 2020

(65) Prior Publication Data
US 2022/0125007 A1 Apr. 28, 2022

(51) Int. Cl.
*A01K 1/02* (2006.01)

(52) U.S. Cl.
CPC .......... *A01K 1/0272* (2013.01); *A01K 1/0245* (2013.01)

(58) Field of Classification Search
CPC ........ A01K 1/0272; A01K 1/0245; B60P 3/04
USPC .......................................................... 119/753
See application file for complete search history.

(56) References Cited

U.S. PATENT DOCUMENTS

| | | | | |
|---|---|---|---|---|
| 3,652,120 A | * | 3/1972 | Bernbach | B60N 2/2854 5/118 |
| 4,834,420 A | * | 5/1989 | Sankrithi | B60R 22/10 297/250.1 |
| 4,924,814 A | * | 5/1990 | Beaudet | A01K 1/0272 280/749 |
| 5,005,526 A | * | 4/1991 | Parker | A01K 1/0272 119/751 |
| 5,010,848 A | * | 4/1991 | Rankin | A01K 31/07 D30/118 |
| 5,123,377 A | * | 6/1992 | Edwards | A01K 1/0272 119/28.5 |
| 5,487,361 A | * | 1/1996 | Dean | A01K 1/0272 119/28.5 |
| 5,533,785 A | * | 7/1996 | Gould | B60N 3/107 297/250.1 |
| 5,551,373 A | * | 9/1996 | O'Donnell | A01K 1/0272 297/487 |
| 5,785,003 A | * | 7/1998 | Jacobson | A01K 1/0272 119/28.5 |
| 5,848,817 A | * | 12/1998 | Niehaus | B60R 21/026 280/749 |
| 6,092,488 A | * | 7/2000 | Allawas | A01K 1/0245 119/497 |
| 6,250,700 B1 | * | 6/2001 | Traxler | B61D 45/006 410/135 |
| 6,742,837 B1 | * | 6/2004 | Alexander | B60R 7/043 297/188.21 |

(Continued)

*Primary Examiner* — Timothy D Collins
*Assistant Examiner* — Nicholas Leo Seneczko
(74) *Attorney, Agent, or Firm* — Frank A. MacKenzie; Bejin Bieneman PLC (57) ABSTRACT

A pet restraint system includes a vehicle floor and a vehicle seat supported by the vehicle floor. The vehicle seat defines a seat-rearward direction. A pet restraint device includes a frame having a lower portion disposed on the vehicle floor and an upper portion supported by the lower portion. The pet restraint device includes a partition supported by the upper portion and is elongated in the seat-rearward direction from the upper portion to the vehicle seat. The partition is telescopic in the seat-rearward direction.

20 Claims, 5 Drawing Sheets

(56) References Cited

U.S. PATENT DOCUMENTS

| | | | | |
|---|---|---|---|---|
| 7,857,370 B2* | 12/2010 | Heller | B60R 21/055 | 280/751 |
| 8,091,513 B1* | 1/2012 | Garcia | A01K 1/0272 | 119/28.5 |
| 8,220,416 B1* | 7/2012 | Stahl | A01K 1/0272 | 296/24.31 |
| 8,333,159 B2* | 12/2012 | Schroer | A61D 3/00 | 119/753 |
| 8,607,735 B1* | 12/2013 | Klinker | A01K 27/002 | 119/28.5 |
| 8,757,099 B1* | 6/2014 | McCarthy | A01K 1/0272 | 119/771 |
| 8,857,850 B2* | 10/2014 | Avanian | B60R 21/02 | 280/751 |
| 9,237,739 B1* | 1/2016 | Tomlin | A01K 1/0353 | |
| 11,006,612 B2* | 5/2021 | Ryan | B60N 3/001 | |
| 11,186,430 B2* | 11/2021 | Williams | B60R 7/043 | |
| 2005/0166862 A1* | 8/2005 | Sanford | B60P 3/42 | 119/498 |
| 2006/0150922 A1* | 7/2006 | Kroculick | A01K 1/0272 | 119/753 |
| 2007/0069562 A1* | 3/2007 | Van Montfort | B60N 2/2893 | 297/253 |
| 2007/0157891 A1* | 7/2007 | Wayn | B60R 22/10 | 119/771 |
| 2007/0295285 A1* | 12/2007 | Smith | A01K 13/001 | 119/753 |
| 2008/0011234 A1* | 1/2008 | Wilkes | B60R 7/043 | 119/28.5 |
| 2008/0184937 A1* | 8/2008 | Hoffman | A01K 1/0272 | 119/28.5 |
| 2009/0199770 A1* | 8/2009 | Jakubowski | A01K 1/0272 | 119/28.5 |
| 2011/0042989 A1* | 2/2011 | Heller | A01K 1/0272 | 296/24.46 |
| 2012/0006283 A1* | 1/2012 | Katz | A01K 15/00 | 119/753 |
| 2012/0312251 A1* | 12/2012 | Udebiuwa | A01K 1/0272 | 119/771 |
| 2014/0252751 A1* | 9/2014 | Avan | B60R 21/02 | 280/751 |
| 2015/0034018 A1* | 2/2015 | Edmonds | A01K 1/0245 | 119/496 |
| 2015/0264887 A1* | 9/2015 | Parness | B60N 2/6063 | 297/180.14 |
| 2018/0020636 A1* | 1/2018 | Weerappuli | A01K 1/0272 | 119/453 |
| 2018/0050642 A1* | 2/2018 | Waddell | B60N 3/001 | |
| 2019/0029217 A1* | 1/2019 | Ryan | A01K 1/0353 | |
| 2019/0104702 A1* | 4/2019 | Edwards | A01K 1/0272 | |
| 2019/0106034 A1* | 4/2019 | Leon Guerrero | B60N 2/3045 | |
| 2019/0275949 A1* | 9/2019 | Kubota | B60R 7/043 | |
| 2019/0313597 A1* | 10/2019 | Chen | A01K 1/0254 | |
| 2019/0380299 A1* | 12/2019 | Shewfelt | A01K 1/0263 | |
| 2020/0086823 A1* | 3/2020 | Koop | A01K 27/002 | |

\* cited by examiner

PET RESTRAINT SYSTEM

BACKGROUND

Pet owners may choose to travel with their pet. For example, the pet owner may travel with their pet in a vehicle, allowing the pet to sit unrestrained in the vehicle. This may allow the pet to wander about the vehicle and to interact with the pet owner while the vehicle is being operated. However, when the pet is unrestrained in the vehicle, the pet may become a projectile inside the vehicle if the vehicle is involved in a collision or otherwise impacted.

DETAILED DESCRIPTION

A pet restraint system includes a vehicle floor and a vehicle seat supported by the vehicle floor. The vehicle seat defines a seat-rearward direction. A pet restraint device includes a frame having a lower portion disposed on the vehicle floor and an upper portion supported by the lower portion. The pet restraint device includes a partition supported by the upper portion and elongated in the seat-rearward direction from the upper portion to the vehicle seat. The partition is telescopic in the seat-rearward direction.

The pet restraint system may include a cushion supported by the upper portion and facing the vehicle seat.

The upper portion may include an attachment attached to the vehicle seat.

The lower portion may include an attachment attached to the vehicle seat.

The pet restraint system may include an arm supported by the upper portion and extending in the seat-rearward direction to the vehicle seat.

The vehicle seat may include a seatbelt assembly and the arm may include an end spaced from the upper portion. The end may be selectively engageable with the seatbelt assembly.

A pet restraint device includes a frame including a lower portion configured to abut a floor and an upper portion supported by the lower portion. The frame defines a lateral axis. A partition is supported by the upper portion and configured to abut a seat. The partition is elongated along an axis transverse to the lateral axis and is telescopic along the axis.

The pet restraint device may include a cushion supported by the upper portion and extending in a plane transverse to the axis.

The cushion and the partition may each extend away from the upper portion in a same direction.

The upper portion may include an attachment configured to attach to the seat.

The lower portion may include an attachment configured to attach to the seat.

The pet restraint device may include an arm supported by the upper portion and extending along the axis, the arm being configured to abut the seat.

The arm may be spaced from the partition along the lateral axis.

The arm may include an end spaced from the upper portion, the end being configured to engage a seatbelt assembly.

The frame may include two sides spaced from each other along the lateral axis. The partition may be disposed on one side and the arm may be disposed on the other side.

The frame may include two sides spaced from each other along the lateral axis. The partition may be disposed on one side.

The frame may include two sides spaced from each other along the lateral axis. The partition may be disposed between the two sides.

The upper portion may include a bottom adjacent to the lower portion and a top spaced from the bottom. The partition may include one rod disposed at each of the top and the bottom of the upper portion.

The partition may include a panel extending from one rod to the other rod.

The pet restraint device may include a second partition supported by the upper portion and spaced from the partition along the lateral axis, the second partition configured to abut the seat and being telescopic along the axis.

With reference to the Figures, wherein like numerals indicate like parts throughout the several views, a pet restraint system 12 is shown. The pet restraint system 12 includes a floor 14 of a vehicle 10 and a seat 16 of the vehicle 10 supported by the floor 14. The seat 16 defines a seat-rearward direction D1. A pet restraint device 18 includes a frame 20 having a lower portion 22 disposed on the floor 14 and an upper portion 24 supported by the lower portion 22. The pet restraint device 18 includes a partition 26 supported by the upper portion 24 and elongated in the seat-rearward direction D1 from the upper portion 24 to the seat 16. The partition 26 is telescopic in the seat-rearward direction D1.

A pet owner may travel in the vehicle 10 with their pet. As set forth further below, the vehicle 10 may include a front seat 16a and a rear seat 16b. The pet owner may sit in the front seat 16a and the pet may sit in the rear seat 16b with the pet restraint device 18 in front of the pet. That is, the pet restraint device 18 is disposed between the pet, i.e., the rear seat 16b, and the front seat 16a. During a vehicle impact, the pet may impact the pet restraint device 18. The pet restraint device 18 may absorb all or part of the energy from the pet, which may assist in controlling kinematics of the pet. The partition 26 of the pet restraint device 18 extends to the rear seat 16b to prevent the pet from impacting other objects (e.g., another pet, vehicle components, cargo, etc.) in the vehicle 10. Specifically, the partition 26 of the pet restraint device 18 is telescopic so as to adjust to extend various distances from the frame 20 to the rear seat 16b (e.g., based on a length of a seat bottom, a contour of a seatback, an orientation of a seatback, etc.). That is, the partition 26 can extend from the frame 20 to the rear seat 16b regardless of the size and shape of the rear seat 16b (see FIG. 2). By being telescopic, the partition 26 can assist in controlling kinematics of the pet regardless of the size and shape of the rear seat 16b.

Figure 1:
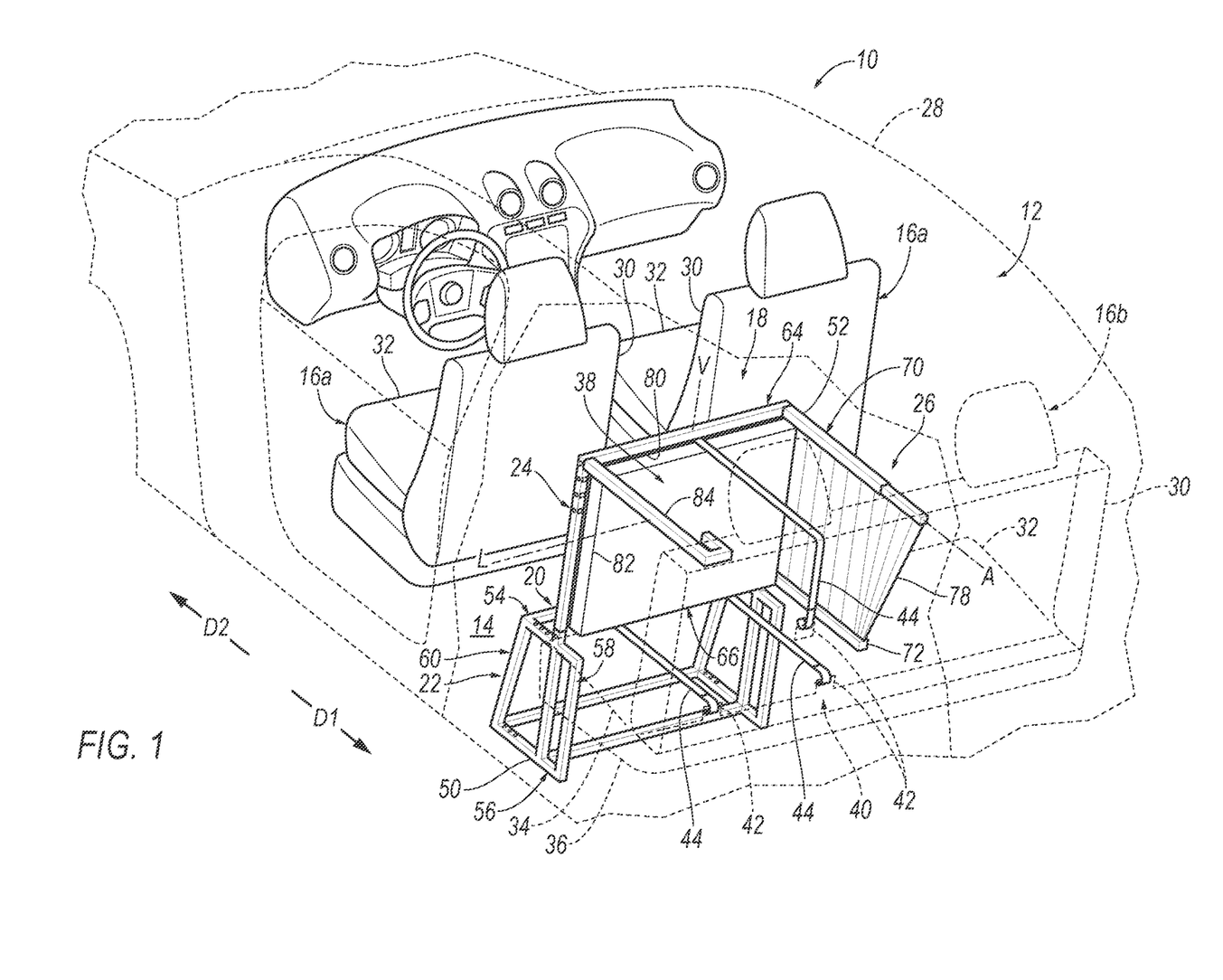
FIG. 1 is a perspective view of a pet restraint system including a pet restraint device.
Figure 5:
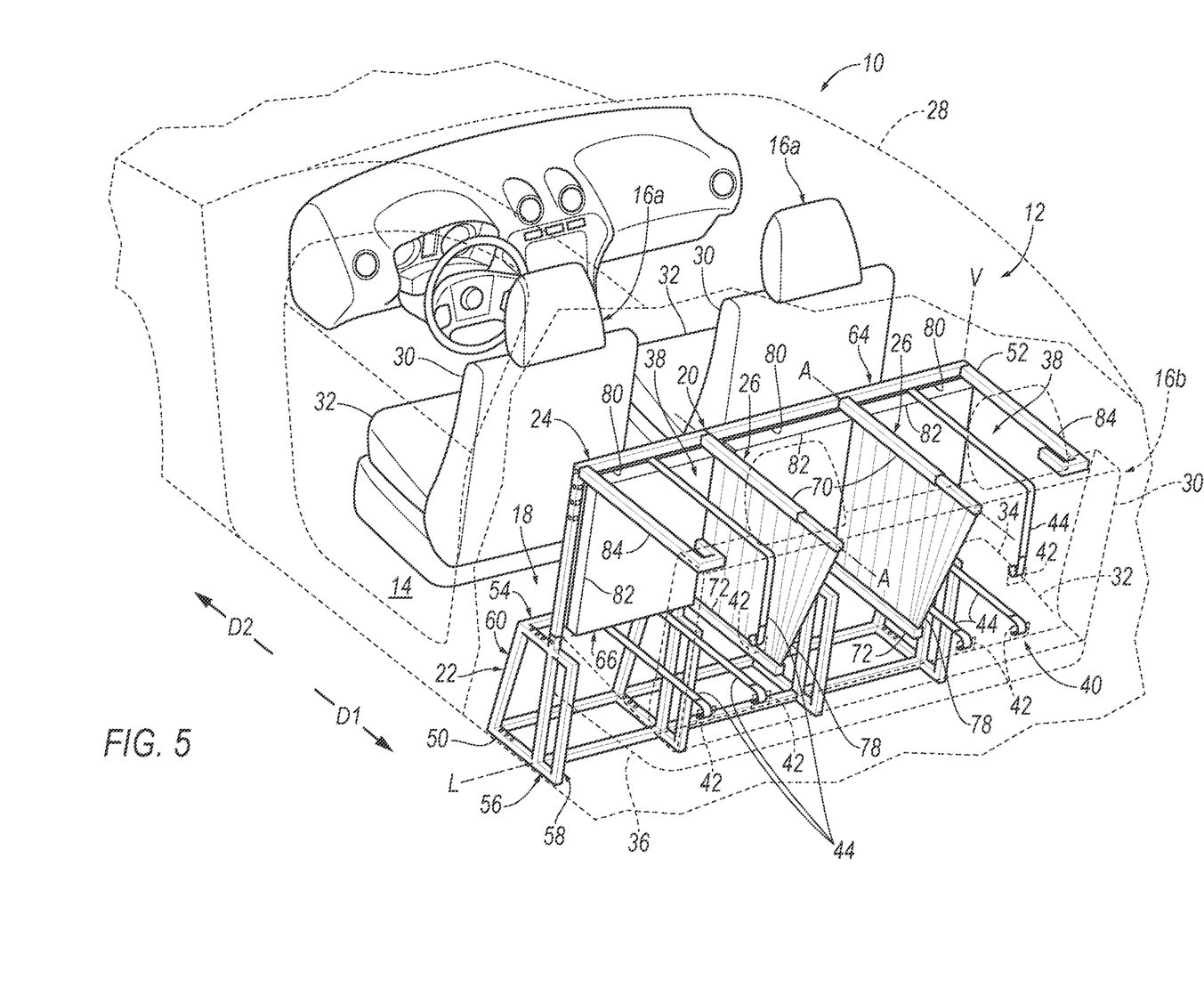
FIG. 5 is a perspective view of the pet restraint system including another example pet restraint device.

With reference to FIGS. 1 & 5, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 includes a body 28 defining a passenger cabin (not numbered) to house occupants, if any, of the vehicle 10. The body 28 may include a roof (not numbered) and the floor 14 with the roof defining an upper boundary of the passenger cabin and the floor 14 defining a lower boundary of the passenger cabin. In other words, the floor 14 is a component of the vehicle 10. The body 28 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 16. The seats 16 may be arranged in any suitable arrangement. For example, one or more of the seats 16 may be at the front end of the passenger cabin, i.e., a front seat 16a, and/or one or more of the seats 16 may be at the rear end of the passenger cabin, i.e., a rear seat 16b.

With continued reference to FIGS. 1 & 5, each seat 16 may include a seatback 30 and a seat bottom 32. The seatback 30 may be supported by the seat bottom 32 and may be stationary or movable relative to the seat bottom 32. The seatback 30 and the seat bottom 32 may be adjustable in multiple degrees of freedom. Specifically, the seatback 30 and the seat bottom 32 may themselves be adjustable, in other words, adjustable components within the seatback 30 and/or the seat bottom 32 may be adjustable relative to each other.

The seat bottom 32 includes a top 34 and a bottom 36 spaced from the top 34 and the seatback 30. For example, the top 34 of the seat bottom 32 may be adjacent to the seatback 30 and the bottom 36 of the seat bottom 32 may be adjacent to the floor 14. The top 34 faces a seating area 38 of the seat 16. The seating area 38 is the area occupied by a pet when seated on the seat bottom 32.

With continued reference to FIGS. 1 & 5, each seat 16 defines a seat-forward direction D2. The seat-forward direction D2 extends forward relative to the seat 16. For example, the seat-forward direction D2 may extend from a rear of the seat 16 to a front of the seat 16 relative to an occupant of the seat 16, i.e., the occupant of the seat 16 faces in the seat-forward direction D2. As another example, the seat bottom 32 may extend from the seatback 30 in the seat-forward direction D2. The seat-rearward direction D1 extends in an opposite direction than the seat-forward direction D2. That is, the seat-rearward direction D1 extends rearward relative to the seat 16, e.g., from the front of the seat 16 to the rear of the seat 16 relative to the occupant of the seat 16.

Each seat 16 is supported by the floor 14, as shown in FIGS. 1 & 5. Each seat 16 may slide relative to the floor 14, e.g., in the seat-forward direction D2 or a seat-rearward direction D1. In such an example, the seat 16 may be supported on a seat track (not shown) to allow the seat 16 to move in the seat-forward direction D2 or the seat-rearward direction D1. The seat 16 may be selectively slidable relative to the seat track. In other words, the occupant may slide the seat 16 along the seat track and may secure the seat 16 to the seat track at selected position. For example, the occupant may actuate a motor (not shown) that moves the seat 16 along the seat track. As another example, each seat 16 may be fixed relative to the floor 14. In this situation, the seat 16 may be immovable relative to the floor 14.

The vehicle 10 may include one or more restraint systems. The restraint systems may engage the pet restraint device 18 to fix the pet restraint device 18 to the vehicle 10. For example, the restraint system may be an infant seat attachment system 40, e.g., a Lower Anchors and Tethers for Children (LATCH) system, as shown in FIGS. 1-3 & 5. The infant seat attachment system 40 may include one or more anchor brackets 42 each attached to one of the seat 16 or a component of the vehicle 10 adjacent to the seat 16, e.g., the body 28. The pet restraint device 18 may be releasably connected to the anchor brackets 42 of the infant seat attachment system 40, e.g., via one or more attachments 44, as set forth below.

Figure 3:
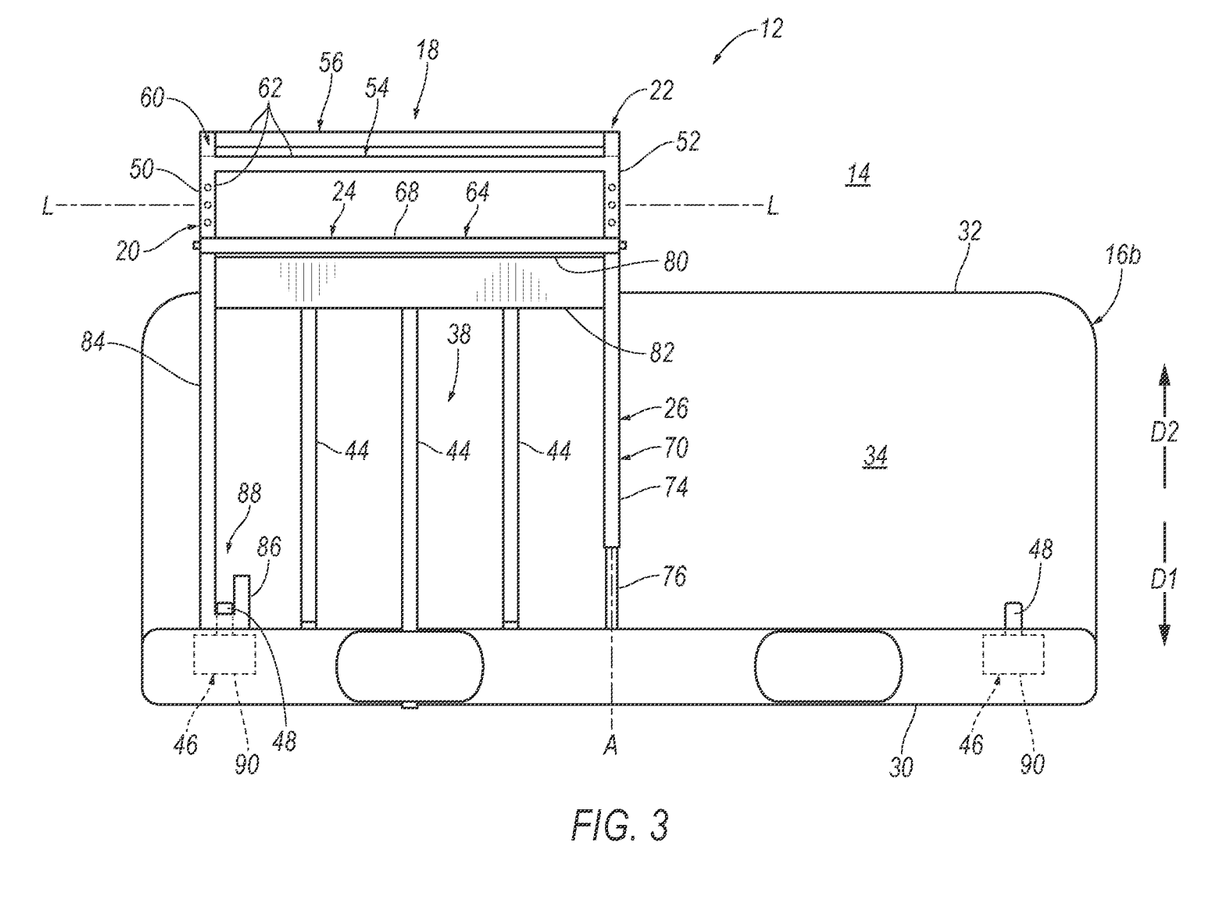
FIG. 3 is a top view of the pet restraint system.

Additionally, or alternatively, the restraint system of the vehicle 10 may include a plurality of seatbelt assemblies 46, as shown in FIG. 3. Each seatbelt assembly 46 may be mounted to one respective seat 16 or a component of the vehicle 10 adjacent to one respective seat 16. Each seatbelt assembly 46 may include a locking retractor 90, a belt 48 engaged with the locking retractor 90, a clip (not shown) on the belt, and a buckle (not shown) releasably lockable with the clip. The belt 48 is extendable and retractable from the locking retractor 90. Upon sudden deceleration, the locking retractor 90 may lock the belt 48 to the retractor to prevent the belt 48 from extending or retracting relative to the retractor. The belt 48 may be engaged with the pet restraint device 18 to lock the pet restraint device 18 to the rear seat 16b, as shown in FIG. 3. Specifically, the belt 48 may be engaged with the pet restraint device 18 (as discussed below), and the clip may be engaged with the buckle to connect the pet restraint device 18 to the rear seat 16b.

With reference to FIGS. 1 & 5, the pet restraint device 18 is disposed in and fixed to the vehicle 10. The pet restraint device 18 and components of the vehicle 10, e.g., the floor 14 and seat 16 form, at least in part, the pet restraint system 12. Specifically, the pet restraint device 18 is disposed between the front seat 16a and the rear seat 16b. The frame 20 is supported by the floor 14 of the vehicle 10. Specifically, the lower portion 22 of the frame 20 abuts the floor 14 of the vehicle 10. The upper portion 24 is disposed in front of the seating area 38 of the rear seat 16b. For example, the upper portion 24 may partially define the seating area 38 when the pet restraint device 18 is disposed in the vehicle 10.

The frame 20 of the pet restraint device 18 defines a lateral axis L and a vertical axis V transverse to the lateral axis L. The frame 20 includes two sides 50, 52 spaced from each other along the lateral axis L. The sides 50, 52 may be spaced from each other by any suitable amount. That is, the frame 20 may extend any suitable amount across the passenger cabin of the vehicle 10. For example, one side 52 of the frame 20 may be spaced from the corresponding side of the vehicle 10. That is, the frame 20 may extend partially across the passenger cabin, as shown in FIGS. 1 and 3. As another example, the sides of the frame 20 may be adjacent to corresponding sides of the vehicle 10. That is, the frame 20 may extend entirely across the passenger cabin, i.e., from one side of the vehicle 10 to the other side of the vehicle 10, as shown in FIG. 5. Said differently, each side 50, 52 of the frame 20 may be adjacent to a door on the corresponding side of the vehicle 10.

With reference to the Figures, the lower portion 22 includes a top 54 and a bottom 56 spaced from the top 54. The top 54 and the bottom 56 each extend from one side 50 of the frame 20 to the other side 52 of the frame 20. That is, the lower portion 22 extends from one side 50 of the frame 20 to the other side 52 of the frame 20. The bottom 56 of the lower portion 22 abuts the floor 14. The top 54 of the lower portion 22 is spaced from the floor 14. For example, the top 54 of the lower portion 22 may be disposed between the floor 14 and the top 34 of the seat bottom 32, i.e., below the seating area 38.

The lower portion 22 includes a front 58 and a back 60. The front 58 is spaced from the back 60 and the front seat 16a. That is, the back 60 is disposed between the front 58 and the front seat 16a. The front 58 and the back 60 each extend from one side 50 of the frame 20 to the other side 52 of the frame 20. The lower portion 22 may have any suitable shape, e.g., a trapezoidal prism.

Figure 4:
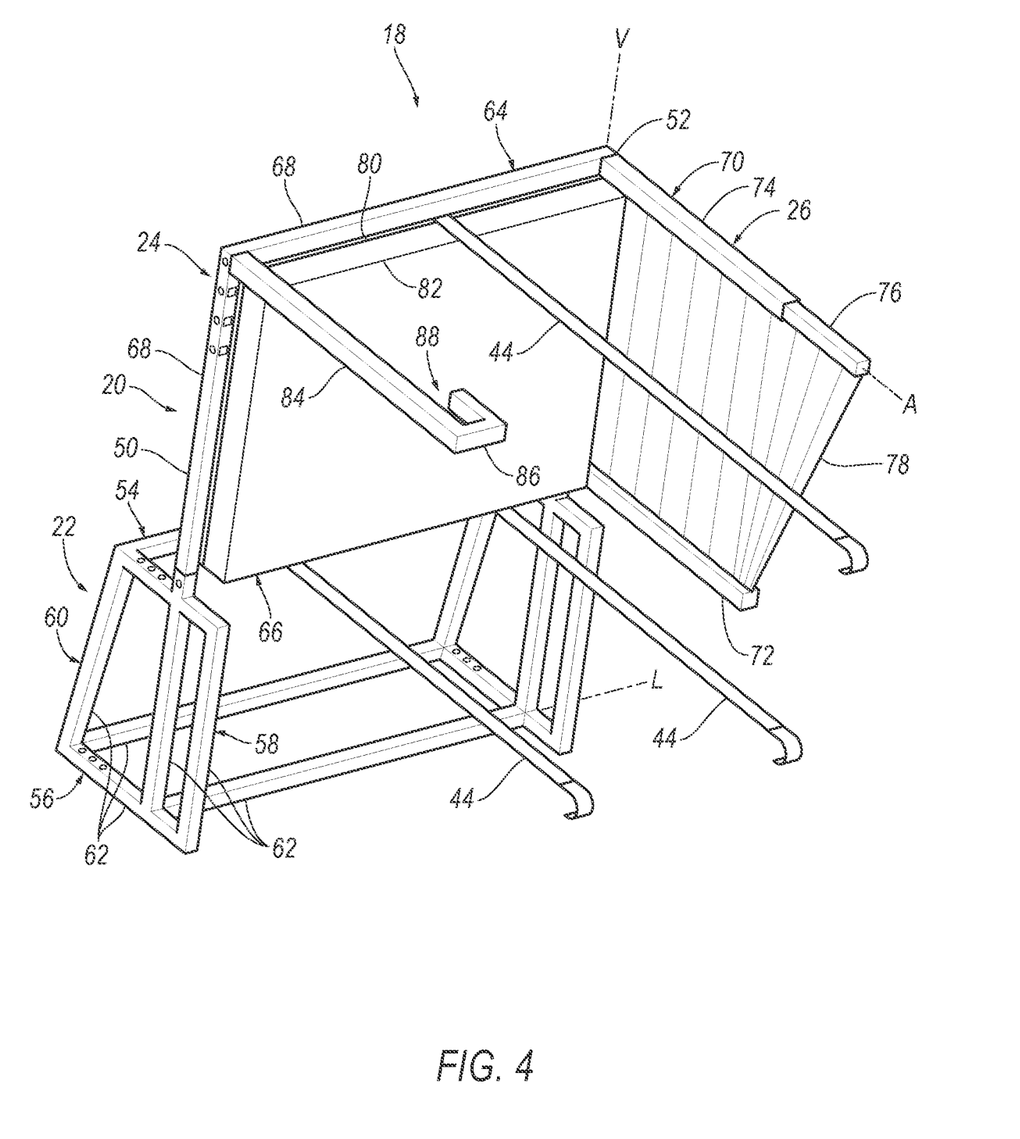
FIG. 4 is a perspective view of the pet restraint device.

The lower portion 22 may include a plurality of lower frame members 62, as shown in FIG. 4. The lower frame members 62 may be attached to each other in any suitable manner. For example, the lower frame members 62 may be selectively attachable to each other, e.g., via quick release pins. That is, the lower portion 22 of the frame 20 may be manually disassembled, e.g., to support ingress and/or egress of the lower portion 22 relative to the vehicle 10. In such an example, the lower frame members 62 may be selectively attachable to each other at one of a plurality of locations. Said differently, a perimeter of the lower portion 22 may be adjustable. For example, the back 60 may be retractably extendable relative to the front 58. That is, the back 60 can be moved in the seat-forward direction D2 or the seat-rearward direction D1 relative to the front 58, e.g., to allow the pet restraint device 18 to fit between the front seat 16a and the rear seat 16b. Said differently, a distance from the front 58 to the back 60 of the lower portion 22 can be adjusted to be less than or equal to a distance between the seats 16. As another example, the lower frame members 62 may be fixed to each other, e.g., via welding, adhering, etc.

With continued reference to the Figures, the upper portion 24 includes a top 64 and a bottom 66 spaced from the top 64. The top 64 and the bottom 66 each extend from one side 50 of the frame 20 to the other side 52 of the frame 20. That is, the upper portion 24 extends from one side 50 of the frame 20 to the other side 52 of the frame 20. The bottom 66 of the upper portion 24 is adjacent to the top 54 of the lower portion 22. The top 64 of the upper portion 24 is spaced from the lower portion 22, i.e., between the lower portion 22 and the roof of the vehicle 10. The upper portion 24 is disposed in front of the seating area 38. The upper portion 24 may be disposed at the front 58 of the lower portion 22.

The upper portion 24 may include a plurality of upper frame members 68, as shown in FIG. 4. The upper frame members 68 may be attached to each other in any suitable manner, e.g., via welding, adhering, etc. The upper portion 24 may have any suitable shape, e.g., a square, rectangle, etc. The upper portion 24 is supported by the lower portion 22. For example, at least one upper frame member 68 on each side 50, 52 of the frame 20 may be attached to a corresponding lower frame member 62 on the respective side 50, 52 of the frame 20. The upper frame members 68 may be selectively attachable to the corresponding lower frame members 62, e.g., via quick release pins. That is, the upper portion 24 may be manually disassembled from the lower portion 22, e.g., to support ingress and/or egress of the upper portion 24 relative to the vehicle 10. Alternatively, the upper frame members 68 may be fixedly attached to the corresponding lower frame members 62, e.g., via welding, adhering, etc.

The upper frame members 68 and the lower frame members 62 may be any suitable material. The upper frame members 68 and the lower frame members 62 may be a same or different material. For example, the upper frame members 68 and the lower frame members 62 may be formed of aluminum, nylon, polyvinyl chloride, etc.

The frame 20 may include one or more attachments 44 configured to attach the pet restraint device 18 to the vehicle 10. The frame 20 may include any suitable number of attachments 44, e.g., one or more. For example, the attachment(s) 44 may be configured to attach to one respective anchor bracket 42 of the infant seat attachment system 40, as shown in FIGS. 1 and 5. For example, the upper portion 24 may include at least one attachment 44 configured to attach the upper portion 24 to the vehicle 10. As an example, the attachment 44 may be a tether fixed to the top 64 of the upper portion 24, as shown in FIG. 4, and attachable to one anchor bracket 42 on the rear seat 16b, e.g., via a clip, hook, etc. Additionally, or alternatively, the lower portion may include at least one attachment 44 configured to attach the lower portion 22 to the vehicle 10. As an example, the attachment 44 may be a tether fixed to the top 54 of the lower portion 22, as shown in FIG. 4, and attachable to one anchor bracket 42 on the rear seat 16b, e.g., via a clip, hook, etc.

As set forth above, the partition 26 is supported by the upper portion 24 of the frame 20. For example, the partition 26 may be selectively attachable to at least one upper frame member 68, e.g., via quick release pins. That is, the partition 26 may be manually disassembled from the upper portion 24, e.g., to support ingress and/or egress of the partition 26 relative to the vehicle 10. The partition 26 may be disposed on one side 50 of the frame 20, as shown in FIGS. 1-4. Alternatively, the partition 26 may be disposed between the sides 50, 52 of the frame 20, as shown in FIG. 5. The pet restraint device 18 may include any suitable number of partitions 26, e.g., one or more. When the pet restraint device 18 includes more than one partition 26, the partitions 26 are spaced from each other along the lateral axis L, as shown in FIG. 5. For example, one partition 26 may be disposed on one side 50 of the frame 20 and another partition 26 may be disposed between the sides 50, 52 of the frame 20. As another example, a plurality of partitions 26 may be spaced from each other and from each side 50, 52 of the frame 20, as shown in FIG. 5.

Figure 2:
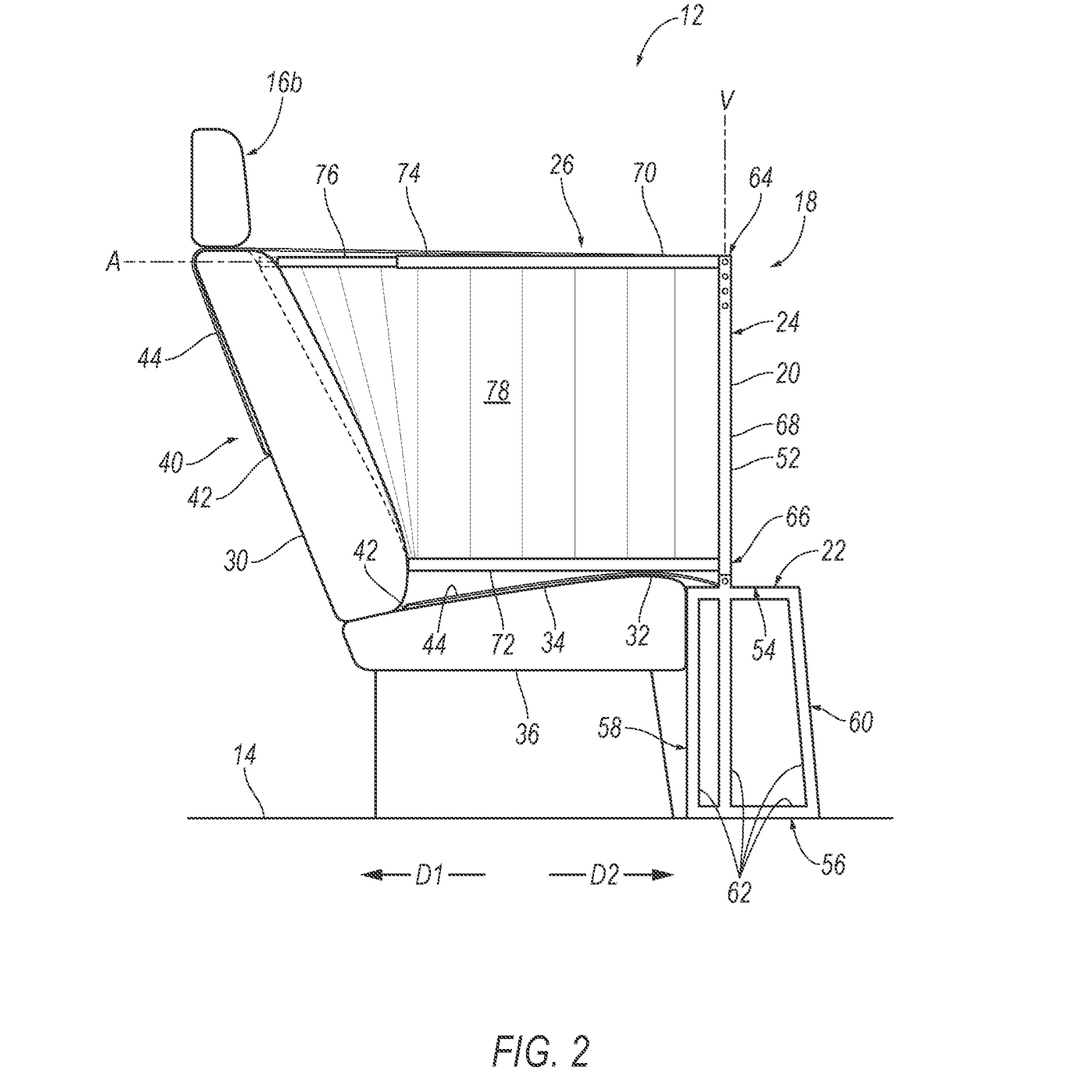
FIG. 2 is a side view of the pet restraint system including a partition extending to one seatback shown in solid lines and another seatback shown in hidden lines.

The partition 26 is elongated along an axis A, i.e., in the seat-rearward direction D1, away from the upper portion 24. Specifically, the partition 26 extends from the upper portion 24 of the frame 20 to the seatback 30 of the rear seat 16b, i.e., across the seat bottom 32 in the seat-rearward direction D1, as shown in FIGS. 2 and 3. The partition 26 extends along a side of the seating area 38 of the rear seat 16b. That is, the partition 26 may partially define the seating area 38 of the rear seat 16b, which may assist in retaining the pet to the seating area 38, e.g., during operation of the vehicle and/or during a vehicle impact.

With reference to FIG. 2, the partition 26 includes an upper rod 70 and a lower rod 72 spaced from the upper rod 70 along the vertical axis V of the frame 20. The rods 70, 72 may be spaced from each other by any suitable amount. That is, each of the rods 70, 72 may be selectively attachable to the upper portion 24 at one of a plurality of locations along the upper portion 24, e.g., one upper frame member 68. For example, the upper rod 70 may be disposed at the top 64 of the upper portion 24, and the lower rod 72 may be disposed at the bottom 66 of the upper portion 24. The relative positions of the rods 70, 72 may be manually adjusted according to a height of the seatback 30. The upper rod 70 and the lower rod 72 may, for example, be releasably connected to the anchor brackets 42 of the infant seat attachment system 40, e.g., via respective attachments 44, as set discussed above.

The upper rod 70 includes an inner portion 74 and an outer portion 76. The inner portion 74 and the outer portion 76 of the upper rod 70 are elongated along the axis A. The inner portion 74 defines a cavity (not shown) extending along the axis A. For example, the inner portion 74 may extend annularly about the axis A. In such an example, the cavity extends circumferentially about the axis A.

The outer portion 76 is received in the cavity of the inner portion 74. The outer portion 76 is slidable within the inner portion 74. That is, the partition 26, e.g., the upper rod 70, is telescopic. The outer portion 76 is sized to be slidable within the inner portion 74. For example, an outer diameter of the outer portion 76 may be smaller than the diameter of the cavity. The outer portion 76 may include a stop (not shown) that engages a lip (not shown) on the inner portion 74 to stop relative sliding of the outer portion 76.

The upper rod 70 may include a spring (not shown), or the like, disposed in the cavity of the inner portion 74. The spring is engaged with the outer portion 76 to bias the outer portion 76 away from the upper portion 24 of the frame 20, i.e., in the seat-rearward direction D1. Biasing the outer portion 76 away from the upper portion 24 allows the partition 26 to contact the seatback 30 of the rear seat 16b regardless of the size and shape of the seatback 30 (see FIG. 2).

With continued reference to FIG. 2, the outer portion 76 is compressible along the axis A by the seatback 30 of the rear seat 16b. That is, the outer portion 76 contacts the seatback 30 of the rear seat 16b when the pet restraint device 18 is disposed between the front and rear seats 16a, 16b. In this situation, the outer portion 76 may slide along the axis A relative to the inner portion 74. That is, the rear seat 16b exerts a force greater than a biasing force of the spring such that the outer portion 76 is pushed towards the upper portion 24 of the frame 20, i.e., in the seat-forward direction D2, when the upper rod 70 contacts the seatback 30.

The lower rod 72 may be a unitary, i.e., single, piece. That is, the lower rod 72 may extend a constant distance in the seat-rearward direction D1. Alternatively, the lower rod 72 may be substantially the same as the upper rod 70, i.e., include an inner portion and an outer portion. That is, the lower rod 72 may be telescopic.

The partition 26 includes a panel 78 extending from the upper rod 70 to the lower rod 72. Additionally, the panel 78 extends from one end to the other end of each rod. That is, the panel 78 extends along the rods 70, 72 in the seat-rearward direction D1. The panel 78 is connected to the upper rod 70 and the lower rod 72, e.g., via stitching, ultrasonic welding, etc. For example, the panel 78 may be connected to each rod 70, 72 from one respective end to the other respective end, i.e., entirely along a length of each rod 70, 72.

The panel 78 may be a single continuous unit, e.g., a single piece of fabric. As another example, the panel 78 may include a plurality of segments, i.e., two or more. The segments may be attached to each other in any suitable fashion, e.g., a plurality of panels attached by stitching, ultrasonic welding, etc. Alternatively, the panel 78 may be a net. That is, the panel 78 may include a plurality of cords arranged in a grid like (e.g., a lattice) pattern. The cords may be of any suitably flexible material with a suitably high tensile strength, e.g., nylon. The panel 78 may be formed of any suitable fabric, e.g., foamed fabric, woven nylon yarn such as nylon 6-6, polyester, etc.

The pet restraint device 18 may include a support panel 80 supported by the upper portion 24 of the frame 20. For example, the support panel 80 may be fixed to the upper portion 24 of the frame 20, e.g., via welding, adhering, fasteners, etc. The support panel 80 may extend across the upper portion 24 from one side 50 of the frame 20 to the other side 52 of the frame 20, as shown in FIG. 3. Additionally, the support panel 80 may extend across the upper portion 24 from the top 64 to the bottom 66 of the upper portion 24, as shown in FIGS. 1 and 5. Said differently, the support panel 80 may extend in a plane transverse to the axis A. The support panel 80 may be formed of hard plastic.

The pet restraint device 18 includes a cushion 82 supported by the upper portion 24 of the frame 20. For example, the cushion 82 may be attached to the support panel 80, e.g., via stitching, ultrasonic welding, etc. The support panel 80 may be disposed between the cushion 82 and the upper portion 24 of the frame 20. The cushion 82 may extend across the support panel 80, e.g., from one side 50 to the other side 52 of the frame 20, as shown in FIG. 3, and from the top 64 to the bottom 66 of the upper portion 24, as shown in FIGS. 1 and 5. That is, the cushion 82 may cover the support panel 80. The cushion 82 may extend away from the support panel 80 and towards the rear seat 16b, i.e., in the seat-rearward direction D1, as shown in FIG. 3. That is, the cushion 82 and the partition 26 extend away from the upper portion 24 in a same direction. The cushion 82 may extend any suitable amount towards the rear seat 16b. In other words, the cushion 82 may have any suitable thickness.

The cushion 82 may be impacted by a pet during a vehicle impact. In this situation, the cushion 82 may be deformed, e.g., plastically and/or elastically, between the support panel 80 and the pet. In other words, the support panel 80 may be a reaction surface for the cushion 82 when the cushion 82 is impacted by the pet. That is, the support panel 80 may be rigid relative to the cushion 82. As the cushion 82 is deformed, the cushion 82 may absorb all or part of the energy of the pet due to momentum from the vehicle impact. The cushion 82 may be formed of any suitable material. For example, the cushion 82 may be formed of polystyrene, polypropylene, nylon, an aramid polymer, a meta-aramid polymer, a stretchable plastic, a crushable foam such as expanded polystyrene (EPS), or any other energy absorbing material.

The pet restraint device 18 may include an arm 84 supported by the upper portion 24 of the frame 20. The arm 84 may be attached to the upper portion 24. For example, the arm 84 may be selectively attachable, e.g., via quick release pins, to one upper frame member 68. In such an example, the arm 84 may be attached to the upper portion 24 of the frame 20 at one of a plurality of locations between the top 64 and the bottom 66 of the upper portion 24, as shown in FIGS. 1 and 5. As another example, the arm 84 may be fixed to one upper frame member 68, e.g., via welding, adhering, etc. The arm 84 may be formed of any suitable material. The arm 84 may be a same or different material than the lower and upper frame members 62, 68.

The arm 84 is spaced from the partition 26 along the lateral axis L of the frame 20. The pet restraint device 18 may include any suitable number of arms 84. For example, the pet restraint device 18 may include one arm 84 disposed on one side 50 of the frame 20, as shown in FIGS. 1, 3 & 4. In such an example, one or more partitions 26 are spaced from the one side 50 of the frame 20. As another example, the pet restraint device 18 may include one arm 84 disposed on one side 50 of the frame 20 and another arm 84 disposed on the other side 52 of the frame 20, as shown in FIG. 5. In such an example, one or more partitions 26 are spaced from each side 50, 52 of the frame 20.

With reference to FIG. 3, the arm 84 may extend from the upper portion 24 towards the rear seat 16b. The arm 84 may be configured to abut the rear seat 16b. That is, the arm 84 may extend from the upper portion 24 to the rear seat 16b. The arm 84 may include an end 86 configured to engage one seatbelt assembly 46. For example, the end 86 may define a channel 88 sized and/or shaped to receive the belt 48 of the seatbelt assembly 46. That is, the end 86 may be selectively engageable with the belt 48 of the seatbelt assembly 46. For example, when the pet restraint device 18 is disposed in the vehicle 10, a user may manually insert the belt 48 into the channel 88. During a vehicle impact, the locking retractor 90 of the seatbelt assembly 46 may lock the belt 48, which causes the end 86 of the arm 84 to remain in contact with the rear seat 16b. By maintaining the end 86 of the arm 84 in contact with the rear seat 16b, the cushion 82 can remain in the plane transverse to the axis A prior to being impacted by a pet, which can reduce the risk of injury to the pet.

In operation, the pet restraint device 18 is disposed between the front and rear seats 16a, 16b and in front of a pet. The pet restraint device 18 may be fixed to the rear seat 16b via the attachments 44. As the pet moves relative to the rear seat 16b due to momentum of the vehicle impact, the pet moves towards the cushion 82. When the pet impacts the cushion 82, the pet restraint device 18 remains fixed to the rear seat 16b, and the cushion 82 deforms to control kinematics of the pet. Additionally, the partition 26 extends to the seatback 30 of the rear seat 16b. Specifically, the partition 26 of the pet restraint device 18 is telescopic so as to adjust to extend various distances from the frame 20 to the rear seat 16b. By being telescopic, the partition 26 can assist in controlling kinematics of the pet regardless of the size and shape of the rear seat 16b.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A pet restraint system, comprising:
a vehicle floor;
a vehicle seat supported by the vehicle floor, the vehicle seat including a front and a seatback spaced from the front in a seat-rearward direction;
a pet restraint device including a frame having a lower portion disposed on the vehicle floor and an upper portion supported by the lower portion;
the pet restraint device including a partition supported by the upper portion and elongated in the seat-rearward direction from the upper portion to the vehicle seat; and
the partition including an inner portion and an outer portion telescopic relative to the inner portion in the seat-rearward direction, the outer portion biased in the seat-rearward direction.

2. The pet restraint system of claim 1, further comprising a cushion supported by the upper portion and facing the vehicle seat.

3. The pet restraint system of claim 1, wherein the upper portion includes an attachment attached to the vehicle seat.

4. The pet restraint system of claim 1, wherein the lower portion includes an attachment attached to the vehicle seat.

5. The pet restraint system of claim 1, further comprising an arm supported by the upper portion and extending in the seat-rearward direction to the vehicle seat.

6. The pet restraint system of claim 5, wherein the vehicle seat includes a seatbelt assembly and the arm includes an end spaced from the upper portion, the end being selectively engageable with the seatbelt assembly.

7. A pet restraint device, comprising:
a frame including a lower portion configured to abut a floor and an upper portion supported by the lower portion, the upper portion extending from the lower portion along a vertical axis;
the frame including two sides spaced from each other along a lateral axis transverse to the vertical axis, the upper and lower portions each extending from one side to the other side; and
a partition supported by the upper portion and configured to abut a seatback, the partition elongated along an axis transverse to each of the lateral and vertical axes; and
the partition including an inner portion and an outer portion telescopic relative to the inner portion along the axis, the outer portion being biased along the axis away from the frame.

8. The pet restraint device of claim 7, further comprising a cushion supported by the upper portion and extending in a plane transverse to the axis.

9. The pet restraint device of claim 8, wherein the cushion and the partition each extend away from the upper portion in a same direction.

10. The pet restraint device of claim 7, wherein the upper portion includes an attachment configured to attach to the seat.

11. The pet restraint device of claim 7, wherein the lower portion includes an attachment configured to attach to the seat.

12. The pet restraint device of claim 7, further comprising an arm supported by the upper portion and extending along the axis, the arm being configured to abut the seat.

13. The pet restraint device of claim 12, wherein the arm is spaced from the partition along the lateral axis.

14. The pet restraint device of claim 12, wherein the arm includes an end spaced from the upper portion, the end being configured to engage a seatbelt assembly.

15. The pet restraint device of claim 12, wherein the frame includes two sides spaced from each other along the lateral axis, the partition being disposed on one side and the arm being disposed on the other side.

16. The pet restraint device of claim 7, wherein the frame includes two sides spaced from each other along the lateral axis, the partition being disposed on one side.

17. The pet restraint device of claim 7, wherein the frame includes two sides spaced from each other along the lateral axis, the partition being disposed between the two sides.

18. The pet restraint device of claim 7, wherein the upper portion includes a bottom adjacent to the lower portion and a top spaced from the bottom, the partition includes one rod disposed at each of the top and the bottom of the upper portion.

19. The pet restraint device of claim 18, wherein the partition includes a panel extending from one rod to the other rod.

20. The pet restraint device of claim 7, further comprising a second partition supported by the upper portion and spaced from the partition along the lateral axis, the second partition configured to abut the seatback and including an inner portion and an outer portion being telescopic relative to the inner portion along the axis.

\* \* \* \* \*

UNITED STATES PATENT AND TRADEMARK OFFICE
CERTIFICATE OF CORRECTION

PATENT NO. : 11,425,886 B2
APPLICATION NO. : 17/078182
DATED : August 30, 2022
INVENTOR(S) : Parakrama Valentine Weerappuli et al.

It is certified that error appears in the above-identified patent and that said Letters Patent is hereby corrected as shown below:

In the Claims

Claim 1, Column 9, Line 61: replace "portion biased" with "--portion being biased--"

Signed and Sealed this
Twenty-second Day of November, 2022

Katherine Kelly Vidal
*Director of the United States Patent and Trademark Office*